United States Patent [19]
Volz et al.

[11] Patent Number: 5,801,467
[45] Date of Patent: Sep. 1, 1998

[54] ELECTRIC MOTOR FOR A DRIVE MECHANISM IN PARTICULAR, A PUMP

[75] Inventors: Peter Volz, Darmstadt; Hans-Dieter Reinartz, Frankfurt; Dieter Dinkel, Eppstein, all of Germany

[73] Assignee: ITT Automotive Europe GmbH, Frankfurt, Germany

[21] Appl. No.: 649,641

[22] PCT Filed: Sep. 21, 1995

[86] PCT No.: PCT/EP95/03730

§ 371 Date: Aug. 20, 1996

§ 102(e) Date: Aug. 20, 1996

[87] PCT Pub. No.: WO96/09681

PCT Pub. Date: Mar. 28, 1996

[30] Foreign Application Priority Data

Sep. 23, 1994 [DE] Germany ............... 44 33 970.4

[51] Int. Cl.⁶ .............. H02K 5/16; H02K 5/15
[52] U.S. Cl. ................... 310/89; 310/90; 310/43
[58] Field of Search .................. 310/89, 43, 90, 310/85, 40 MM; 417/423.12, 423.14

[56] References Cited

U.S. PATENT DOCUMENTS

| | | | |
|---|---|---|---|
| 2,928,961 | 3/1960 | Morrill | 310/91 |
| 4,152,614 | 5/1979 | Noguchi et al. | 310/233 |
| 4,201,521 | 5/1980 | Carlson | 417/53 |
| 4,573,882 | 3/1986 | Watanabe et al. | 417/366 |
| 5,004,943 | 4/1991 | Gagneux | 310/239 |
| 5,185,544 | 2/1993 | Takada | 310/58 |
| 5,229,671 | 7/1993 | Neidhard et al. | 310/15 |
| 5,243,245 | 9/1993 | Oba | 310/89 |
| 5,393,206 | 2/1995 | Roth et al. | 417/313 |
| 5,576,586 | 11/1996 | Blumenberg | 310/88 |

FOREIGN PATENT DOCUMENTS

| | | |
|---|---|---|
| 1613181 | 10/1970 | Germany . |
| 2640747A1 | 3/1978 | Germany . |
| 3635987A1 | 5/1988 | Germany . |
| 4105349A1 | 8/1992 | Germany . |
| 4234429A1 | 4/1994 | Germany . |
| 4235962A1 | 5/1994 | Germany . |
| 4253962A1 | 5/1994 | Germany . |
| 4241827A1 | 6/1994 | Germany . |
| 9406702.3 | 6/1994 | Germany . |
| 1106478 | 3/1968 | United Kingdom . |
| 1501692 | 2/1978 | United Kingdom . |

Primary Examiner—Steven L. Stephan
Assistant Examiner—Judson H. Jones
Attorney, Agent, or Firm—J. Gordon Lewis; Thomas N. Twomey

[57] ABSTRACT

An electric motor is presented whose housing is sealed off by a plate. The plate features an opening whose inner surface serves as a slide bearing for the shaft, whereby the slide bearing is sufficient for operating the electric motor in a trial run. In addition, a protrusion is provided that can be inserted into a first step of a hole drilled in the pump housing and secures the plate in position in the radial direction on the flanged surface of the pump housing. The outer edge of the plate is formed by a collar, over which the housing can be pushed. Thus, the housing is also fixed in place relative to the plate. overall, a centering of the housing about the motor shaft.

8 Claims, 1 Drawing Sheet

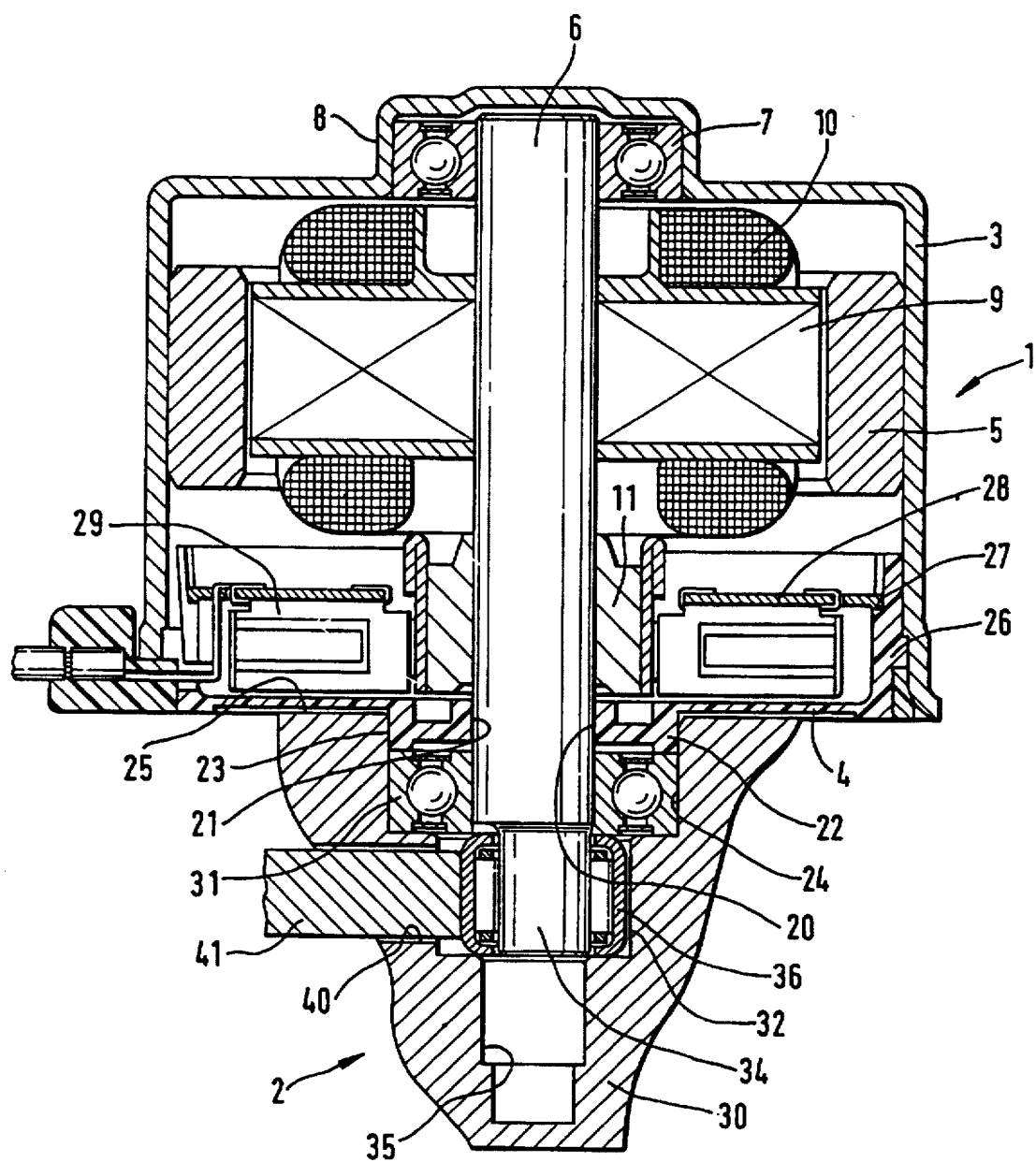

ELECTRIC MOTOR FOR A DRIVE MECHANISM IN PARTICULAR, A PUMP

BACKGROUND OF THE INVENTION

The invention pertains to an electric motor for a drive mechanism, in particular, a pump, with a shaft that is located in the motor housing and runs through a circular, central opening in a plate. An outer edge of the plate forms a guide for the motor housing. The plate features a radially aligned contact surface which establishes a positive connection in the radial direction between the plate and the housing of the drive mechanism.

An electric motor of this type has been disclosed in DE-OS 4,235,962. The electric motor is arranged on a flat, flanged surface of a pump housing. The motor shaft is supported by at least one bearing located in the pump housing. Thus, the motor shaft is aligned with respect to the pump housing. It is now possible to align the motor housing such that it is centered about the motor shaft. To accomplish this, the motor has a plate that fits flush against the pump housing and at its outer edge forms a guide for the motor housing. The above-mentioned bearing extends across part of the length of the pump housing, so that the support plate, which features a corresponding, central recess, can be plugged into the protruding bearing. Thus, the plate and the housing supported by the plate are centrally aligned with respect to the motor shaft.

This arrangement has the additional advantage that the housing, shaft, plate and bearing are initially combined into a single structural unit. This structural unit can be checked for proper functional integrity since the motor shaft is seated in the vicinity of the plate. Next, the structural unit is placed on the pump housing, and the bearing assumes its position in the pump housing and is thus in a position to transfer the radial forces occurring on the motor shaft during operation of the motor-driven pump unit, to the pump housing.

However, this configuration has the one particular disadvantage that the bearing protruding from the plate can be easily damaged during transport. The purpose of the invention is to create an arrangement where the bearing is protected against damage, but at the same time will ensure that the motor housing can be radially aligned with respect to the motor shaft and that the motor can be tested as a stand-alone structural unit.

SUMMARY OF THE INVENTION

In this case, it is proposed that an electric motor like that described above be refined in the following ways. The diameter of the opening is adapted to the diameter of the motor shaft so that the inner surface of the opening will serve as a bearing for the shaft; in addition, a contact surface is formed at the outer edge of a protrusion of the plate.

This protrusion is preferably coaxially aligned with respect to the opening and is in the shape of a ring whose outer surface forms the contact surface and whose inner surface moves as the bearing surface in contact with the motor shaft.

This structure allows the main bearing to be installed in the drive mechanism housing and allows the electric motor structural unit to be assembled without this bearing. The surface at the inner edge of the plate designed as a slide bearing is sufficient to seat the motor shaft for a trial run.

Thus, the main bearing can be installed in the pump housing independent of the motor and be secured against damage there.

The pump housing features corresponding recesses, in which the protrusion of the plate can be inserted, so that the motor housing and the plate can be secured in the radial direction with respect to one another.

Preferably, the front surface of the protrusion has contact surfaces at least in partial regions which will move along the pump housing after assembly of the electric motor to make contact with the outer ring of the main bearing and lock it in place in the axial direction in the pump housing.

In addition, the diameter of the protrusion corresponds to the outer diameter of the bearing, so that a blind hole with a constant diameter can be provided in the pump housing for the bearing and for the protrusion.

The plate can also be designed as a brush support plate, as proposed in DE-OS 4,235,962. However, a separate brush support plate can also be provided which rests upon protrusions that are formed on an elevation of the outer edge of the plate running in the axial direction. Preferably, the brushes are attached to the underside of the brush support plate, so that the brushes are located between the support plate and plate.

The invention will be explained in greater detail below with reference to one embodiment.

BRIEF DESCRIPTION OF THE DRAWINGS

FIG. 1 is a sectional view of an electric motor embodying the invention.

DETAILED DESCRIPTION OF A PREFERRED EMBODIMENT

The embodiment is represented in a single figure which shows a cross section through an electric motor/pump unit. The electric motor 1 is shown in its entirety, and the pump unit 2 is shown in part. The electric motor 1 features a housing 3 which consists of a cylindrical pot which is open on one side. This side is sealed off by a plate 4.

At its inner side the housing 3 has permanent magnets 5 which are of segmented design and are glued or otherwise joined to the housing 3. The housing 3 itself consists of magnetically conducting material, so that it will ensure magnetic return.

A motor shaft 6 is located in the center of the housing 3. This shaft is supported, in part, by a bearing 7 located in the base 8 of the housing 3. As shown in FIG. 1, this bearing 7 is an anti-friction bearing of the ball bearing type. Within the housing 3, the shaft 6 has an armature 9 with coils 10. In addition, a commutator 11 is provided, located near the open end of the housing 3. The armature and the coils, as well as the commutator, are of the usual design, in particular, the design suggested for direct current electric motors, so that no more detailed explanation at this point is necessary.

The open end of the housing 3, as already mentioned, is closed off by a plate 4. The plate 4 features a central opening 20 through which the motor shaft 6 extends to the outside. The diameter of the opening approximately equals the diameter of the shaft 6, so that the surface (slide surface) 21 of the opening moves into contact with the surface of the shaft 6. In this manner a slide bearing is formed. The plate 4—which is otherwise essentially flat—is thickened in the vicinity of the opening 20. Thus, an outward protrusion 22 is formed which has an essentially annular structure. The inner surface of the ring provides a contribution to the size of the slide surface 21 of the opening. The outer surface 23 of the ring is inserted into the hole 24 of the pump housing. Since the diameter of the hole 24 corresponds to the outer diameter of the ring 22, the plate 4 can be mounted in place in the radial direction on the flanged surface 25 of the pump housing.

At its outer edge, the plate 4 has a collar 26 which extends into the housing 3. The outer diameter of the collar 26 corresponds essentially to the inner diameter of the housing 3, so that the housing 3 can be pushed onto the collar 26 practically without play, so that the housing is fixed in place with respect to the plate 4.

A circumferential edge 27 is provided on the inside of the collar 26 on which a brush support plate 28 rests. Several brushes 29 are attached to the brush support plate 28, and the brushes 29 are located underneath the brush support plate 28, that is, between the brush support plate 28 and the plate 4.

The pump housing 30 is essentially a rectangular block, which is shown only in part, and in addition to the pump piston 41, it has valves and a reservoir (not illustrated).

One base surface of the rectangle forms a flanged surface 25 for the electric motor. A stepped blind hole extends into the rectangle perpendicular to this flanged surface 25.

The outer, first step 24 holds a main bearing 31, and the diameter of this step 24 corresponds to the outer diameter of the bearing 31. As can be seen in FIG. 1, the bearing 31 is an anti-friction bearing of the ball bearing type.

In the second step 32, a drilled hole 40 opens perpendicularly to the blind hole and guides the pump piston 41. After the assembly of the electric motor and pump, an eccentric 34 is located in the vicinity of this step 32; this eccentric is formed as an extension of the motor shaft 6. A third step 35 holds an additional bearing—not shown in detail here—in which the end of the motor shaft 6 is seated.

A roller bearing is located on the eccentric 34; its outer ring 36 comes into contact with the inner ring of the bearing 31.

Proceed as follows to assemble the electric motor/pump unit.

First, assemble the electric motor by installing the shaft 6 equipped with armature 9 and collector 11 into the housing 3. Next, place the brush support plate 28 with the brushes 29 onto plate 4 and insert the plate into the open end of the housing 3, and insert the motor shaft 6 through the opening 20.

Before the assembly with the pump, the motor shaft 6 is held in the motor bearing 7 and by the slide bearing 21.

Since the support plate is made of plastic, the bearing properties of the slide bearing 21 are not suitable for permanent operation, but are indeed suitable for a trial run in order to check the functional integrity of the electric motor 1.

The pump housing can be prepared as follows.

First, install a bearing in the last step 35 of the blind hole, and then, in the second step 32, install the roller bearing for the eccentric. Next, install the main bearing 31 in the first step 24.

The electric motor 1 can now be connected with the pump 2. In this case, the completed electric motor 1 is arranged on the flanged surface 25. The end of the motor shaft 6 extending from the motor housing 3 is located within the pump housing 30. The motor shaft 6 is supported by the main bearing 31. The slide bearing 21 no longer contributes to the support of the motor shaft.

When arranging the electric motor 1 on the flanged surface 25, the protrusion 22 moves into the first hole step 24, so that the outer surfaces 23 of the protrusion 22 come to rest against the wall of the first hole step 24. Thus, we have a radial attachment of the plate and, since the motor housing 3 is fixed in place with respect to the plate, a radial alignment of the motor housing 3 with respect to the shaft 6 will result.

I claim:

1. An electric motor for use with a drive mechanism, the motor comprising:

a shaft including an armature fixed thereto;

a motor housing in which the shaft and armature are rotatably disposed, said housing having a base, said base supporting the shaft on a first side of the armature, and the housing having an open end opposite the base through which a portion of the shaft on a second side of the armature extends;

a first anti-friction bearing disposed in the base and supporting the shaft on the first side of the armature; and a plastic end cover plate disposed over the opening and having a central opening therein, said central opening being approximately equal in diameter to the shaft and being coaxial with respect to the shaft such that an inner surface of said central opening is in contact with any surface of the shaft and is a slide bearing formed on the end cover plate by an annular protrusion receiving the shaft on the second side of the armature wherein the slide bearing rotatably supports the shaft on the second side of the armature to enable testing the motor and and a front surface of the annular protrusion is configured to contact an outer ring of a main anti-friction bearing in a drive mechanism.

2. An electric motor as claimed in claim 1, wherein an outer diameter of the annular protrusion is approximately equal to an outer diameter of the main anti-friction bearing.

3. An electric motor a claimed in claim 1, wherein an outer edge of the end cover plate is formed into a collar, said collar being provided with a radial protrusion, with a brush support plate resting thereon.

4. An electric motor according to claim 2, wherein brushes are mounted on a brush support plate, the brushes being located between the brush support plate and the end cover plate.

5. An electric motor in combination with a drive mechanism, comprising:

a shaft including an armature fixed thereto;

a motor housing in which the shaft and armature are rotatably disposed, said housing having a base, said base supporting the shaft on a first side of the armature, and the housing having an open end opposite the base through which a portion of the shaft on a second side of the armature extends;

a first anti-friction bearing disposed in the base and supporting the shaft on the first side of the armature; and a plastic end cover plate disposed over the opening and having a central opening therein, said central opening being approximately equal in diameter to the shaft and being coaxial with respect to the shaft such that an inner surface of said central opening is in contact with any surface of the shaft and is a slide bearing formed on the end cover plate by an annular protrusion receiving the shaft on the second side of the armature wherein the slide bearing rotatably supports the shaft on the second side of the armature to enable testing the motor and and a front surface of the annular protrusion contcts an outer ring of a main anti-friction bearing in the drive mechanism.

6. An electric motor as claimed in claim 5, wherein an outer diameter of the annular protrusion is approximately equal to an outer diameter of the main anti-friction bearing.

7. An electric motor a claimed in claim 5, wherein an outer edge of the end cover ate is formed into a collar, said collar being provided with a radial protrusion, with a brush support plate resting thereon.

8. An electric motor according to claim 6, wherein brushes as mounted on a brush support plate, the brushes being located between the brush support plate and the end cover plate.

* * * * *

UNITED STATES PATENT AND TRADEMARK OFFICE
CERTIFICATE OF CORRECTION

PATENT NO. : 5,801,467
DATED : Sep. 1, 1998
INVENTOR(S) : Peter Volz; Hans-Dieter Reinartz; Dieter Dinkel It is certified that error appears in the above-indentified patent and that said Letters Patent is hereby corrected as shown below:

Col. 4, line 65, the word "contcts" should be --contacts-- therefor.

Col. 5, line 5, the word "ate" should be --plate-- therefor.
Col. 6, line 2, the word "as" should be --are-- therefor.

Signed and Sealed this

Twenty-third Day of February, 1999

Attest:

Q. TODD DICKINSON

*Attesting Officer*   *Acting Commissioner of Patents and Trademarks*